US008566281B2

(12) United States Patent (10) Patent No.: US 8,566,281 B2
Jess (45) Date of Patent: Oct. 22, 2013

(54) METHOD FOR IMPLEMENTING MULTI-ARRAY CONSISTENCY GROUPS USING A WRITE QUEUING MECHANISM

(75) Inventor: Martin Jess, Erie, CO (US)

(73) Assignee: LSI Corporation, San Jose, CA (US)

( * ) Notice: Subject to any disclaimer, the term of this patent is extended or adjusted under 35 U.S.C. 154(b) by 108 days.

(21) Appl. No.: 13/139,462

(22) PCT Filed: Jan. 23, 2009

(86) PCT No.: PCT/US2009/000430
§ 371 (c)(1),
(2), (4) Date: Jun. 13, 2011

(87) PCT Pub. No.: WO2010/071661
PCT Pub. Date: Jun. 24, 2010

(65) Prior Publication Data
US 2011/0246423 A1 Oct. 6, 2011

Related U.S. Application Data

(60) Provisional application No. 61/203,023, filed on Dec. 18, 2008.

(51) Int. Cl.
*G06F 17/30* (2006.01)
(52) U.S. Cl.
USPC .......................................... 707/639; 707/649
(58) Field of Classification Search
USPC ................................................ 707/639, 649
See application file for complete search history.

(56) References Cited

U.S. PATENT DOCUMENTS

| 7,266,652 | B1 * | 9/2007 | Hotle et al. ................... 711/158 |
| 2004/0153615 | A1 | 8/2004 | Koning et al. |
| 2007/0033356 | A1 * | 2/2007 | Erlikhman ..................... 711/162 |
| 2007/0136389 | A1 | 6/2007 | Bergant et al. |
| 2007/0220311 | A1 * | 9/2007 | Lewin et al. ....................... 714/6 |
| 2008/0147893 | A1 * | 6/2008 | Marripudi et al. ................. 710/5 |
| 2008/0243952 | A1 * | 10/2008 | Webman et al. ............. 707/204 |
| 2009/0327481 | A1 * | 12/2009 | Rickard et al. ................ 709/224 |

OTHER PUBLICATIONS

"EMC NetWorker PowerSnap Module for EMC Symmetrix DMX Version 2.2.1 Administration Guide", EMC Corporation, Jul. 2006, 20 pages; web address http://docs.iws.cs.uni-magdeburg.de/admin/networker-7.3.2/networker_modules/powersnap/symmetrix_2.2.1/nm_powersnap_symmetrix_2.2.1_ag.

* cited by examiner

*Primary Examiner* — Son T Hoang
(74) *Attorney, Agent, or Firm* — Suiter Swantz pc llo (57) ABSTRACT

A method includes applying a write Input/Output (I/O) queue interval to a Logical Unit (LU) member of a consistency group (CG). The method also includes marking each write I/O with a timestamp and suspending I/O from the participating storage array to the LU member of the CG upon the participating storage array receiving a snapshot request from a master storage array. The method further includes determining whether the snapshot request timestamp is within the write I/O queue interval of the participating storage array.

12 Claims, 5 Drawing Sheets

METHOD FOR IMPLEMENTING MULTI-ARRAY CONSISTENCY GROUPS USING A WRITE QUEUING MECHANISM

CROSS-REFERENCE TO RELATED APPLICATIONS

The present application claims the benefit under 35 U.S.C. §119 of PCT Application No. PCT/US09/00430, entitled METHOD FOR IMPLEMENTING MULTI-ARRAY CONSISTENCY GROUPS USING A WRITE QUEUING MECHANISM, filed Jan. 23, 2009, which claims priority under 35 U.S.C. §119 to U.S. Provisional No. 61/203,023, filed Dec. 18, 2008. Said PCT Application No. PCT/US09/00430 and said U.S. Provisional Application Ser. No. 61/203,023 are herein incorporated by reference.

TECHNICAL FIELD

The present disclosure generally relates to the field of storage systems, and more particularly to methods for implementing multi-array consistency groups for database backup.

BACKGROUND

A single application may use multiple Logical Units (LUs). For example, a database system may have a log file on one LU and a data file on another LU. Databases may employ a backup technique which takes a snapshot of database LUs, and backup the snapshots to an appropriate storage media, such as tape. Such a backup technique may be performed without offlining the database; the database may not quiesce I/O (input/output) functionality. For instance, the database application may continue to run while snapshots are taken, where the snapshots may not be coordinated with the database activity. The snapshot backup technique may require a consistent snapshot of all LUs used by the database application before a backup may be performed. This consistency may ensure that the application actually be restored correctly from the backup.

A consistency group (CG) may be used when database systems have LUs located on different storage arrays. A CG may consist of one or more LUs, and may be used to create a snapshot of all members of the CG as a single atomic operation.

SUMMARY

A method for implementing multi-array consistency groups includes applying a write Input/Output (I/O) queue interval to a Logical Unit (LU) member of a consistency group (CG). A storage array where the LU member of the CG resides is a participating storage array. The method also includes marking each write I/O with a timestamp and suspending I/O from the participating storage array to the LU member of the CG upon the participating storage array receiving a snapshot request from a master storage array. The snapshot request has a snapshot request timestamp. The method further includes determining whether the snapshot request timestamp is within the write I/O queue interval of the participating storage array. When the snapshot request timestamp is determined to be within the write I/O queue interval of the participating storage array, the participating storage array performs at least one of: (a) completing each write I/O older than the snapshot request timestamp, (b) creating a local snapshot for the LU member of the CG, or (c) resuming I/O to the LU member of the CG.

A method for implementing multi-array consistency groups includes initiating a consistency group (CG) snapshot on a controller of a CG storage array. The CG storage array with the controller is defined as a master, and a storage array where a Logical Unit (LU) member of the CG resides is a participating storage array. The method also includes recording a timestamp for the initiated CG snapshot and sending a PREPARE request from the master to each controller of each participating storage array. Each participating storage array to receive a PREPARE request is defined as a slave. The method further includes suspending I/O to the LU member and determining whether the timestamp fits within a write Input/Output (I/O) queue interval of the slave, when the slave receives the PREPARE request, flushing each write I/O in the write I/O queue interval that is older than the timestamp when the timestamp fits in the write I/O queue interval, and performing at least one of: (a) creating a snapshot of the LU member, (b) resuming I/O, (c) logging a PREPARED state to a persistent memory, or (d) sending a PREPARE-ACK message to the master.

A computer-readable medium having computer-executable instructions for performing a method, where the method includes applying a write Input/Output (I/O) queue interval to a Logical Unit (LU) member of a consistency group (CG). A storage array where the LU member of the CG resides is a participating storage array. The method also includes marking each write I/O with a timestamp and suspending I/O from the participating storage array to the LU member of the CG upon the participating storage array receiving a snapshot request from a master storage array. The snapshot request has a snapshot request timestamp. The method further includes determining whether the snapshot request timestamp is within the write I/O queue interval of the participating storage array. When the snapshot request timestamp is determined to be within the write I/O queue interval of the participating storage array, the participating storage array performs at least one of: (a) completing each write I/O older than the snapshot request timestamp, (b) creating a local snapshot for the LU member of the CG, or (c) resuming I/O to the LU member of the CG.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1A:
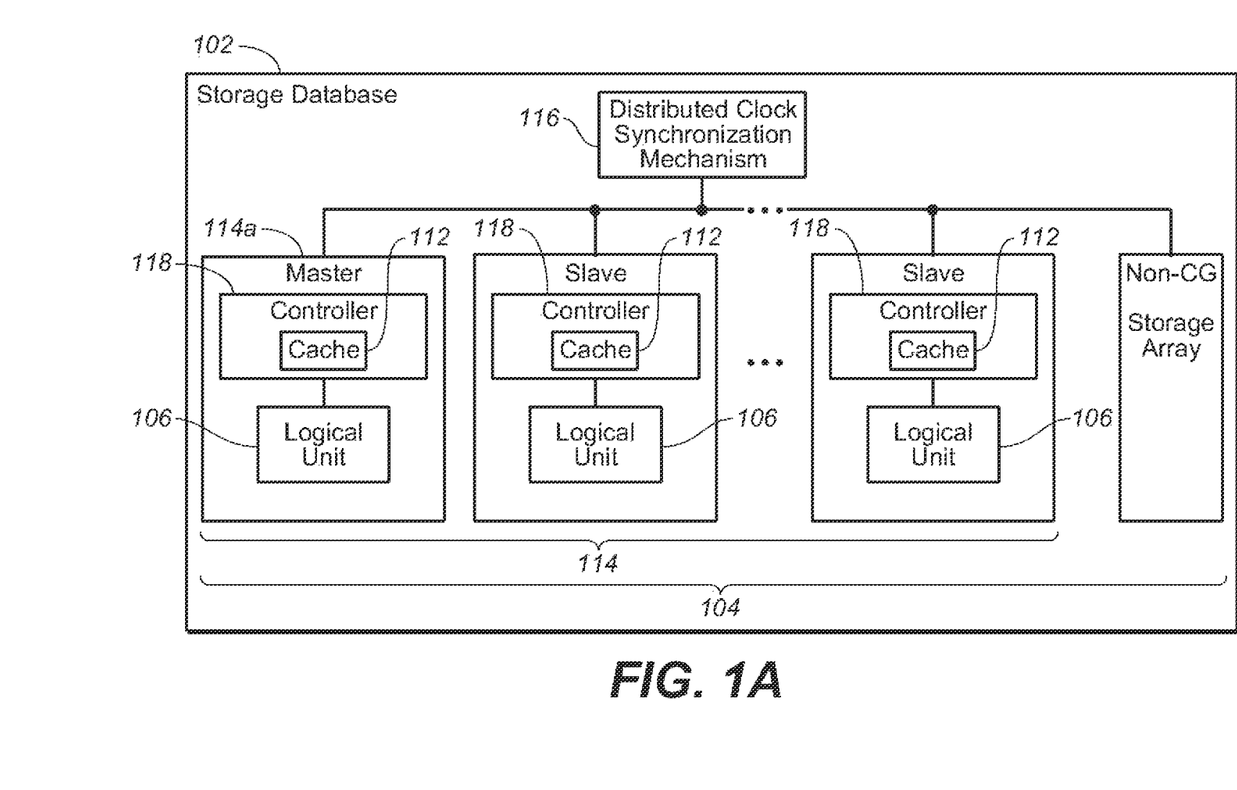
FIG. 1A displays a block diagram of a multi-array storage database.
Figure 1B:
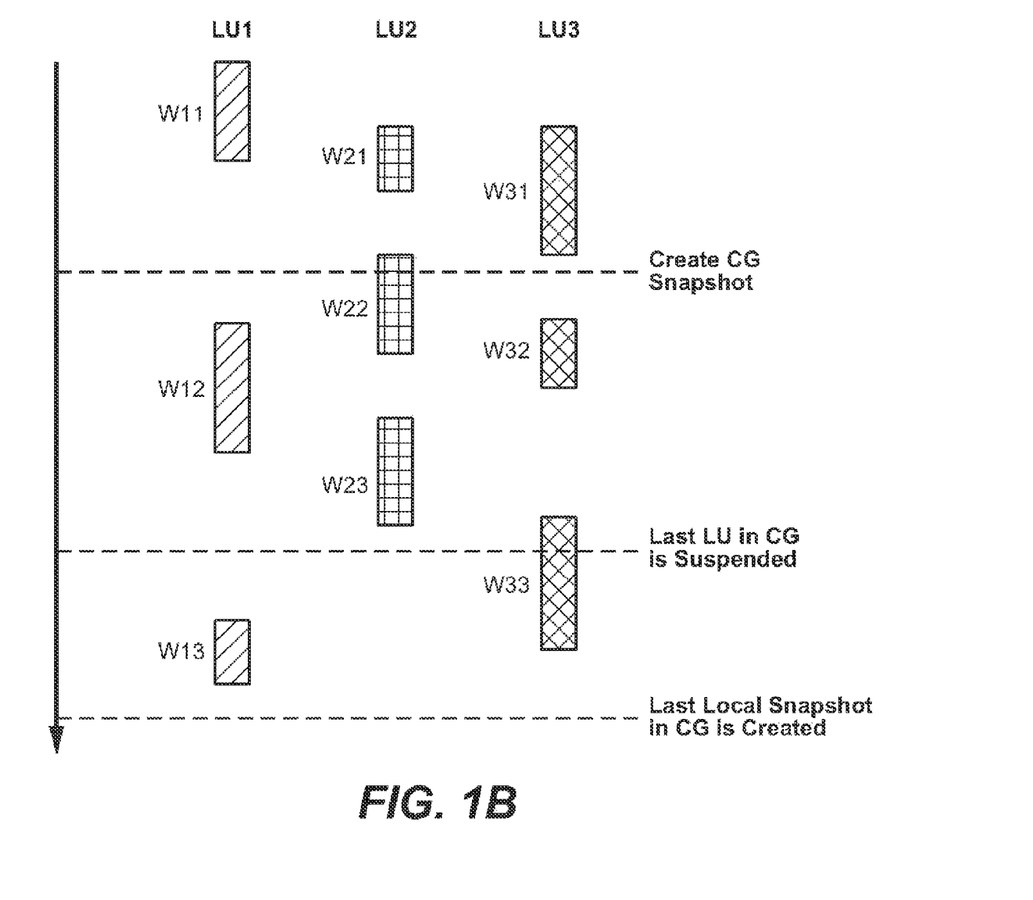
FIG. 1B displays a block diagram of a plurality of write I/Os across a plurality of consistency group members of a storage database.

Referring now to FIGS. 1A and 1B, a block diagram of a multi-array storage database and a block diagram illustrating a plurality of write I/Os across a plurality of consistency group members of a storage database are displayed. A storage database 102 may comprise multiple storage arrays 104, with Logical Units (LUs) located on different storage arrays. A consistency group (CG) may comprise of one or more LUs across a multitude of storage arrays to support creating a snapshot of all CG members as a single atomic operation. In a storage array 104, a host visible small computer system interface (SCSI) Logical Unit (LU) may be mapped to a virtual volume 106, for instance, when a storage virtualization manager (SVM) 108 is deployed in the storage array 104. Virtual volume 106 may be derived from a capacity of one or more storage pools 110 in a storage array 104. FIG. 1B displays three virtual volumes, VV1, VV2, VV3, with a plurality of queued write I/Os, W11, W12, W13, W21, W22, W23, W31, W32, W33. A consistency group may include VV1, VV2, and VV3, however it is appreciated that any number of virtual volumes may be included in the consistency group.

A write I/O queuing mechanism in a storage array controller cache 112 may be used to create a time window during which snapshots may be created over multiple storage arrays 104. The write I/O queuing mechanism may be applied to LUs that are members of a consistency group. A storage array that includes an LU member of a consistency group may be referred to as a participating storage array 114. Each of the participating storage arrays 114 may have a common notion of time, such as through the use of a distributed clock synchronization mechanism 116. For example, the distributed clock synchronization mechanism 116 may be a Network Time Protocol (NTP).

One or more write I/Os may be queued for an LU in a First-In-First-Out (FIFO) order. The FIFO order may be used regardless of whether the write I/O has a Logical Block Address (LBA) that may overlap with the LBA of a write that is already in a cache memory 112 of a storage array controller 118. Each write I/O may be marked with a timestamp from the distributed clock synchronization mechanism 116 used by the participating storage arrays 114. The write I/O queue for an LU in a consistency group may represent a time interval from current time to the timestamp of the oldest write I/O in the queue. The storage array controller 118 may keep enough write I/Os in the queue such that the time interval represented by the write I/O queue is greater than the longest latency for a message communicated between the participating storage arrays 114.

A participating storage array 114 may suspend I/O to a consistency group member when the participating storage array 114 receives a snapshot request from a master storage array 114a. The master storage array 114a may be defined as the storage array that receives a snapshot request from at least one of a user or a host. The participating storage array 114 may determine whether the timestamp of the snapshot request from the master storage array 114a is within the write I/O queue interval. If the snapshot request timestamp is within the write queue interval, the participating storage array 114 may complete writes that are older than the consistency group snapshot request timestamp, create a local snapshot for the LU member of the consistency group, and resume I/O to the LU member of the consistency group.

In the block diagram of FIG. 1B, a consistency group snapshot may include writes W11, W21, and W31, and not include later writes. However, due to delays in a multi-array system, by the time the last storage array suspends the last LU member of the consistency group, writes W22, W12, W32, and W23 have already been enqueued. For the consistency group snapshot to be successful, the queues in the participating storage arrays 114 may be large enough such that writes W22, W12, W32, and W23 are still on the respective participating storage array queue and not written to the LU member of the consistency group when the participating storage arrays 114 receive the consistency group snapshot request. If any of W11, W21, and W31 is still in the queue, each may be flushed to a member LU before the local snapshots are created.

Each participating storage array 114 of a consistency group may exchange test messages with the other participating storage arrays, such as on a regular basis, to determine a roundtrip latency. The roundtrip latency may be used to determine a minimum time interval of the write I/O queue interval. However, it is contemplated that setting the minimum time interval using the roundtrip latency may not always be feasible. For example, the size of the queue for an LU may be limited by a storage array-wide threshold for how much cache memory each LU in a consistency group is allowed to utilize. Thus, when a the cache memory threshold is reached/exceeded upon reception of a new write I/O, older write I/Os may be flushed from the FIFO queue to physical drives, even if this reduces the size of the time interval represented by the queue.

The write queuing mechanism may be deployed for storage arrays that include a battery-backed cache memory. Further, the cache memory may be mirrored to another controller in the storage array, such as for redundancy purposes.

Figure 2A:
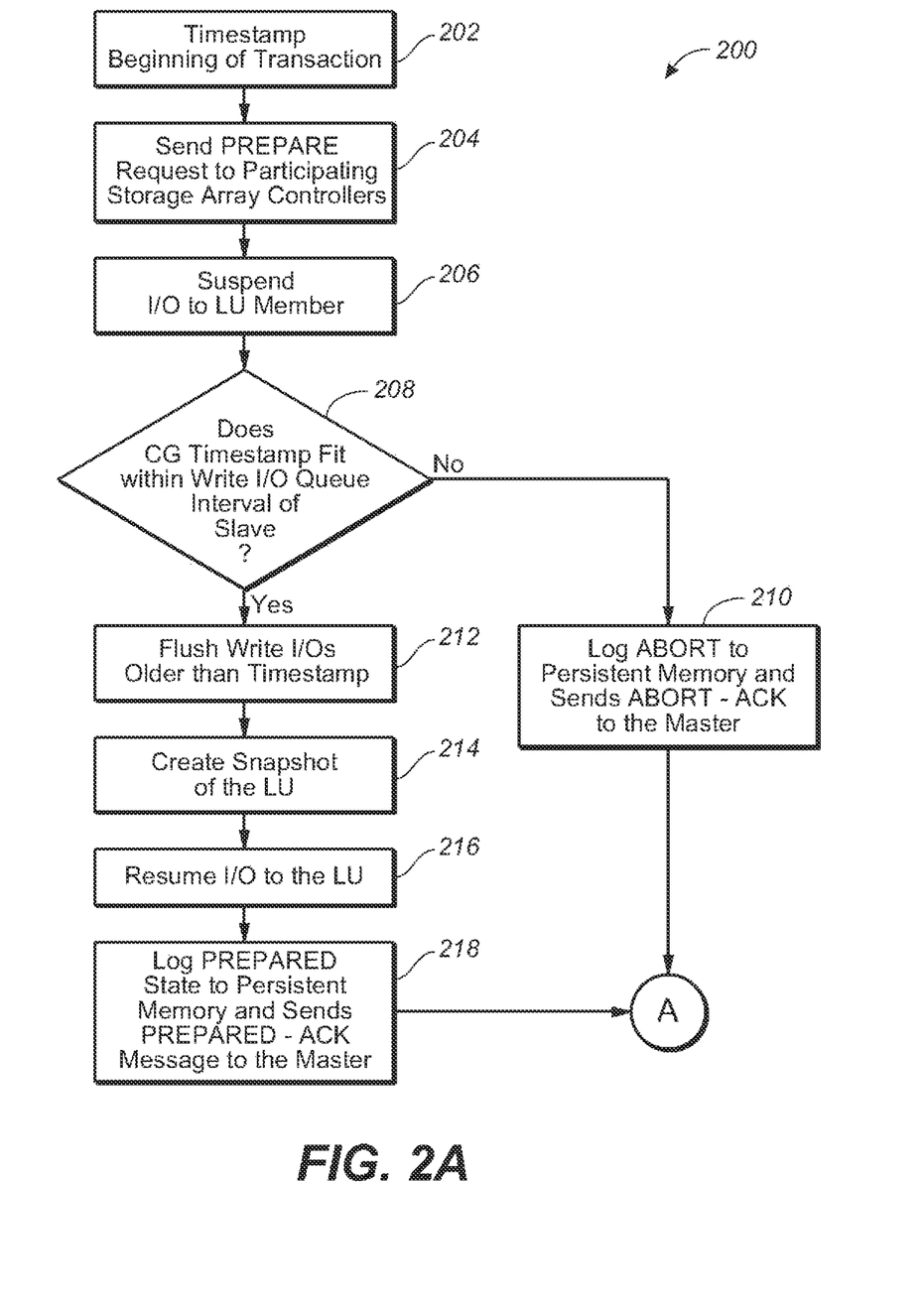
FIGS. 2A and 2B are flow charts illustrating an implementation of a snapshot request on a multi-array storage database.
Figure 2B:
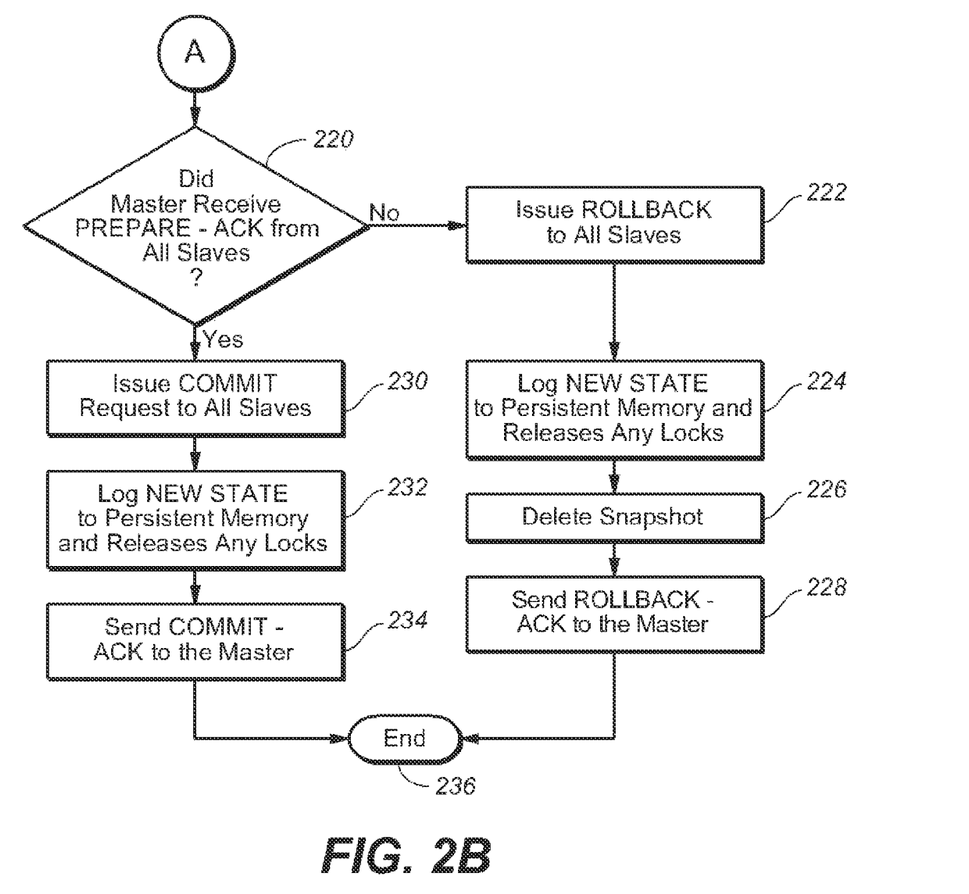

Referring now to FIGS. 2A and 2B, flow charts are depicted illustrating an implementation of a snapshot request on a multi-array storage database. The coordination of the consistency group snapshot creation may leverage the two-phase commit (2PC) protocol. A controller may be defined as a master of the transaction 200 when a consistency group snapshot is initiated on the controller of a participating storage array. The transaction 200 implementing the snapshot request may proceed according to the flow charts of FIGS. 2A and 2B.

In operation 202, a beginning of transaction 200 is timestamped. For instance, a master may timestamp the beginning of transaction 200 according to the distributed clock synchronization mechanism. In operation 204, a PREPARE request is sent all the participating storage array controllers in the consistency group. For instance, the master may send the PREPARE request to all the participating storage array controllers in the consistency group. Each participating storage array to receive a PREPARE request may be defined as a slave. In operation 206, I/O to the LU member of the consistency group is suspended. For instance, the slave may suspend I/O upon receiving a PREPARE request. In operation 208, a fit query is transmitted, the fit query including whether the consistency group timestamp from the master fits within the write I/O queue interval of the slave. For instance, the fit query may be transmitted to the slave's controller. If the result of operation 208 is no, (i.e., the timestamp does not fit within the write I/O queue interval), in operation 210, an ABORT is logged and an ABORT-ACK is sent. For instance, the slave may log ABORT to a persistent memory and send an ABORT-ACK message to the master. The transaction 200 may then proceed to operation 220, explained below. If the result of operation 208 is yes, (i.e., the timestamp fits within the write I/O queue interval), in operation 212, write I/Os that are older than the timestamp of transaction 200 are flushed. For instance, the slave may flush any write I/Os in the queue that are older than the timestamp of transaction 200. In operation 214, a snapshot of the LU is created. For instance, the slave may create a snapshot of the LU. In operation 216, I/O to the LU is resumed. For instance, the slave may resume I/O to the LU. In operation 218, a PREPARED state is logged and a PREPARE-ACK message is sent. For instance, the slave may log a PREPARED state to a persistent memory, and the slave may send a PREPARE-ACK message to the master. The transaction may then proceed to operation 220.

In operation 220, a receive query is transmitted, the receive query including whether the master received PREPARE-ACK messages from all slaves. For instance, the receive query may be transmitted to the master. If the result of operation 220 is no, in operation 222, a ROLLBACK message is issued. For instance, the master may issue a ROLLBACK message to all slaves. In operation 224, the ROLLBACK state is logged, and any locks are released. For instance, when a slave receives the ROLLBACK message, the slave may log the ROLLBACK state to a persistent memory, and the slave may release any locks the slave may have held on behalf of the global transaction 200. In operation 226, the snapshot taken in operation 214 is deleted. For instance, the slave may delete the snapshot taken in operation 214. In operation 228, a ROLLBACK-ACK message is sent. For instance, the slave may send the ROLLBACK-ACK message to the master. The transaction 200 may then end 236, the results of which are explained below. If the result of operation 220 is yes (i.e., a PREPARE-ACK message was received, such as by the master from all slaves), transaction 200 may proceed to operation 230.

In operation 230, a COMMIT request is issued. For instance, the master may issue the COMMIT request to all slaves. In operation 232, a COMMIT state is logged, and any locks are released. For instance, when a slave receives the COMMIT request, the slave may log the COMMIT state to a persistent memory, and the slave may release any locks it was holding on behalf of the global transaction 200. In operation 234, a COMMIT-ACK message is sent. For example, the slave may send a COMMIT-ACK message to the master. The transaction 200 may then end 236. The result of transaction 200 at end 236 may therefore depend on what message the master receives from the slaves. If the master receives COMMIT-ACK messages from all slaves, the global transaction 200 succeeded, and a consistent snapshot has been taken of all the LUs in the consistency group. If the master receives ROLLBACK-ACK messages from all slaves, the global transaction 200 did not result in a consistent snapshot, but each slave cleaned up (e.g., released any locks and deleted the snapshot taken in operation 214).

The 2PC protocol may be a variation called 2PC with presumed ABORT. In this instance, a timer is started when a PREPARE request is sent. For example, the master may start a timer when the master sends a PREPARE request to all the participating storage array controllers in the consistency group (operation 204). If the timer expires before the master receives responses from all slaves, a ROLLBACK message is sent. For instance, if the timer expires without receiving a response from all slaves, the master may assume the global transaction 200 needs to be aborted, and the master may send a ROLLBACK message to all slaves. Thus, if the timer expires before the master receives responses from all slaves, transaction 200 may be treated as though the result to operation 220 is no. If a PREPARE-ACK message is sent after the time expires, the ROLLBACK message may be resent. For instance, if a slave sends a PREPARE-ACK message to the master after the timer expires, such as where a slave went down and came back up after the ROLLBACK message was sent, the master may then resend the ROLLBACK message to that slave so the slave may cleanup.

If the master fails, such as with a permanent failure after sending a PREPARE message to all slaves, each slave may require a manual ROLLBACK. In one embodiment of the present disclosure, the manual ROLLBACK is performed by a user.

It is anticipated that where controller cache memory is limited, other storage devices may be used to stage the queued write I/Os. For instance, Solid State Drives (SSDs) may be used. When another storage device is used, write I/Os may be flushed from the cache memory to the other storage device using a conventional controller cache management mechanism. Then, the write I/O queues are maintained on the other storage device.

The present disclosure is described below with reference to flowchart illustrations of methods. It will be understood that each block of the flowchart illustrations and/or combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart. These computer program instructions may also be stored in a computer-readable tangible medium (thus comprising a computer program product) that can direct a computer or other programmable data processing apparatus to function in a particular manner, such that the instructions stored in the computer-readable tangible medium produce an article of manufacture including instruction means which implement the function/act specified in the flowchart.

In one embodiment of the present disclosure, the write I/O queuing mechanism may be implemented as a compliment to existing RAID (redundant array of independent disks) engine, which may support consistency groups that span multiple storage arrays. Further, the present disclosure may use any local snapshot mechanism known in the art that a storage array supports. The local snapshot mechanism may not be required to be aware of a multi-storage array consistency group, or of the write I/O queue in order to function properly. Additionally, use of the 2PC protocol may enable automatic clean-up of storage arrays in case a consistency group snapshot does not complete.

Figure 3:
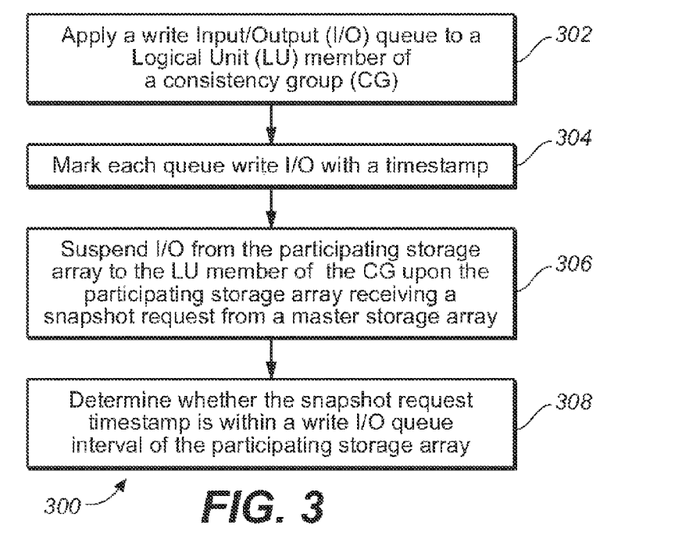
FIG. 3 is a flow chart illustrating a method for implementing multi-array consistency groups using a write queuing mechanism.

Referring now to FIG. 3, a flow chart is displayed illustrating a method 300 for implementing multi-array consistency groups using a write queuing mechanism, in accordance with an embodiment of the present disclosure. Method 300 may apply a write Input/Output (I/O) queue interval to a Logical Unit (LU) member of a consistency group (CG) 302. A storage array where the LU member of the CG resides may be a participating storage array. Method 300 may mark each write I/O with a timestamp 304. Method 300 may suspend I/O from the participating storage array to the LU member of the CG upon the participating storage array receiving a snapshot request from a master storage array 306. The snapshot request may have a snapshot request timestamp. Method 300 may determine whether the snapshot request timestamp is within the write I/O queue interval of the participating storage array 308. When the snapshot request timestamp is determined to be within the write I/O queue interval of the participating storage array, the participating storage array may perform at least one of: (a) completing each write I/O older than the snapshot request timestamp, (b) creating a local snapshot for the LU member of the CG, or (c) resuming I/O to the LU member of the CG.

Applying a write I/O queue interval to a LU member of a CG of method 300 may include queuing write I/Os in a First-In-First-Out (FIFO) order. Marking each write I/O with a timestamp of method 300 may includes synchronizing each participating storage array of the CG according to a distributed clock synchronization mechanism. The distributed clock synchronization mechanism may be a network time protocol (NTP). Applying a write I/O queue interval to a LU member of a CG of method 300 may include representing the write I/O queue interval as a time interval from current time to the timestamp of the oldest write I/O in the queue. Method 300 may further include exchanging a test message between each participating storage array of the CG for determining a roundtrip latency. Method 300 may further include determining a minimum time interval of the write I/O queue interval using the roundtrip latency.

Figure 4:
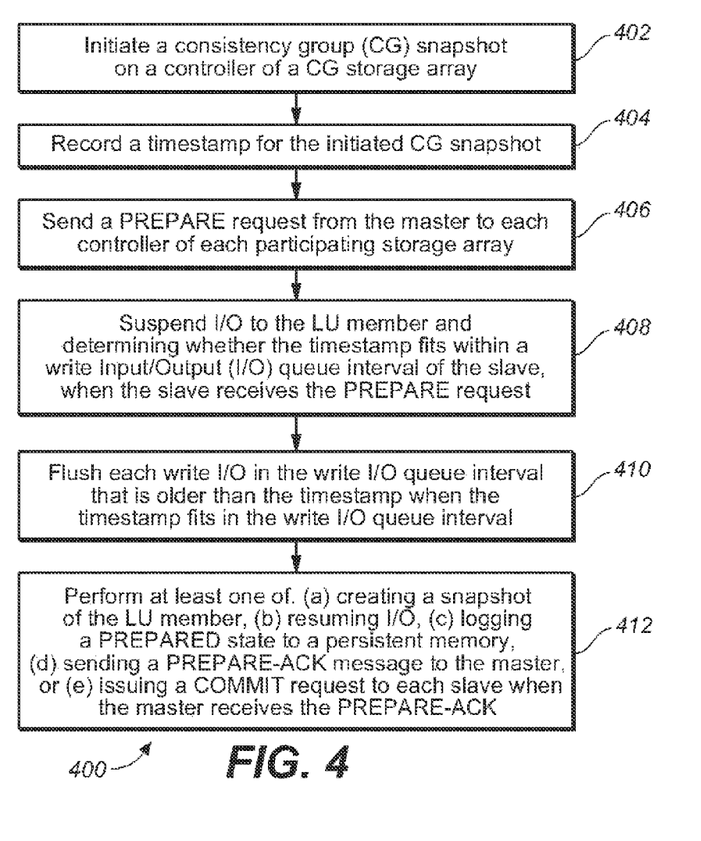
FIG. 4 is a flow chart illustrating a further embodiment of a method for implementing multi-array consistency groups using a write queuing mechanism.

Referring now to FIG. 4, a flow chart is displayed illustrating a further embodiment of a method 400 for implementing multi-array consistency groups using a write queuing mechanism. Method 400 may initiate a consistency group (CG) snapshot on a controller of a CG storage array 402. The CG storage array with the controller may be defined as a master, and a storage array where a Logical Unit (LU) member of the CG resides may be a participating storage array. Method 400 may record a timestamp for the initiated CG snapshot 404. Method 400 may send a PREPARE request from the master to each controller of each participating storage array 406. Each participating storage array to receive a PREPARE request may be defined as a slave. Method 400 may suspend I/O to the LU member and determining whether the timestamp fits within a write Input/Output (I/O) queue interval of the slave, when the slave receives the PREPARE request 408. Method 400 may flush each write I/O in the write I/O queue interval that is older than the timestamp when the timestamp fits in the write I/O queue interval 410. Method 400 may perform at least one of: (a) creating a snapshot of the LU member, (b) resuming I/O, (c) logging a PREPARED state to a persistent memory, or (d) sending a PREPARE-ACK message to the master 412.

Method 400 may further include issuing a COMMIT request from the master to each slave when the master receives the PREPARE-ACK message from each slave. When each slave receives the COMMIT request from the master, each slave may perform at least one of: (a) logging a new state to a persistent memory, (b) releasing a lock held on behalf of a global transaction, (c) deleting the snapshot of the LU member, or (d) sending a COMMIT-ACK message to the master. When the timestamp of method 400 does not fit in the write I/O queue interval, the slave may log an ABORT message to a persistent memory and the slave sends an ABORT message to the master. Method 400 may further include issuing a ROLLBACK message from the master to each slave when the master receives the ABORT message from at least one slave. When each slave receives the ROLLBACK message from the master, each slave may perform at least one of: (a) logging a new state to a persistent memory, (b) releasing a lock held on behalf of a global transaction, (c) deleting the snapshot of the LU member, or (d) sending a ROLLBACK-ACK message to the master. Method 400 may further include initiating a timer, the timer may be initiated upon the step of sending a PREPARE request from the master to each controller of each participating storage array of method 400. Method 400 may further include sending a first ROLLBACK message to each slave when the timer expires prior to the master receiving a response from each slave. Method 400 may further include sending a second ROLLBACK message to a slave when the slave sends a PREPARE-ACK message after the first ROLLBACK message was sent.

In the present disclosure, the methods disclosed may be implemented as sets of instructions or software readable by a device. Such a software package may be a computer program product which employs a computer-readable storage medium including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for implementing multi-array consistency groups using a write queuing mechanism, comprising:
   applying a write Input/Output (I/O) queue interval to a Logical Unit (LU) member of a consistency group (CG), wherein a storage array where the LU member of the CG resides being a participating storage array, wherein the applying includes queuing write I/Os in a First-In-First-Out (FIFO) order;
   marking each write I/O with a timestamp;
   suspending I/O from the participating storage array to the LU member of the CG upon the participating storage array receiving a snapshot request from a master storage array, the snapshot request having a snapshot request timestamp;
   determining a roundtrip latency between at least two participating storage arrays of the CG through an exchange of a pair of test messages;
   determining a minimum time interval of the write I/O queue interval using the roundtrip latency; and
   determining whether the snapshot request timestamp is within the write I/O queue interval of the participating storage array based at least on the minimum time interval of the write I/O queue interval, wherein when the snapshot request timestamp is determined to be within the write I/O queue interval of the participating storage array, the participating storage array performs at least one of:
   (a) completing each write I/O older than the snapshot request timestamp, (b) creating a local snapshot for the LU member of the CG, or (c) resuming I/O to the LU member of the CG.

2. The method of claim 1, wherein the marking each write I/O with the timestamp includes:

synchronizing each participating storage array of the CG according to a distributed clock synchronization mechanism.

3. The method of claim 2, where the distributed clock synchronization mechanism is a network time protocol (NTP).

4. The method of claim 1, wherein the applying the write I/O queue interval to the LU member of the CG includes:

representing the write I/O queue interval as a time interval from a current time to a timestamp of an oldest write I/O in the queue.

5. A method for implementing multi-array consistency groups using a write queuing mechanism, comprising:

initiating a consistency group (CG) snapshot on a controller of a CG storage array, wherein the CG storage array with the controller associated with the initiated CG snapshot being defined as a master, and a storage array where a Logical Unit (LU) member of the CG resides being a participating storage array;

recording a timestamp for the initiated CG snapshot;

sending a PREPARE request from the master to each controller of each participating storage array, each participating storage array to receive the PREPARE request being defined as a slave;

determining a roundtrip latency between at least two participating storage arrays through an exchange of a pair of test messages;

suspending I/O to the LU member of a particular slave, and determining whether the timestamp fits within a write Input/Output (I/O) queue interval of the particular slave, when the particular slave receives the PREPARE request, wherein the write I/O queue interval represents write I/O transactions queued in a First-In-First-Out (FIFO) order;

flushing each write I/O in the write I/O queue interval that is older than the timestamp when the timestamp fits in the write I/O queue interval, wherein when the timestamp does not fit in the write I/O queue interval, the slave logs an ABORT message to a persistent memory of the particular slave and the particular slave sends the ABORT message to the master;

performing, by the particular slave, at least one of:
(a) creating the initiated snapshot of the LU member,
(b) resuming the suspended I/O,
(c) logging a PREPARED state to the persistent memory of the particular slave, or
(d) sending a PREPARE-ACK message to the master; and issuing a ROLLBACK message from the master to each slave when the master receives the ABORT message from the particular slave, wherein when each slave receives the ROLLBACK message from the master, each slave performs at least one of:
(a) logging a new state to a persistent memory of each slave,
(b) releasing a lock held on behalf of a global transaction,
(c) deleting any snapshot of the corresponding LU member, or
(d) sending a ROLLBACK-ACK message to the master.

6. The method of claim 5, further including issuing a COMMIT request from the master to each slave when the master receives the PREPARE-ACK message from each slave.

7. The method of claim of claim 6, wherein when each slave receives the COMMIT request from the master, each slave performs at least one of:
(a) logging the new state to the persistent memory of each slave,
(b) releasing a the lock held on behalf of the global transaction,
(c) deleting the snapshot of the corresponding LU member, or
(d) sending a COMMIT-ACK message to the master.

8. The method of claim 5, further including initiating a timer, the timer initiated upon the step of sending the PREPARE request from the master to each controller of each participating storage array.

9. The method of claim 8, further including sending a first ROLLBACK message to each slave when the timer expires prior to the master receiving a response from each slave.

10. The method of claim 9, further including sending a second ROLLBACK message to a slave when the slave sends a PREPARE-ACK message after the first ROLLBACK message was sent.

11. A non-transitory computer-readable storage medium having computer-executable instructions for performing a method of implementing multi-array consistency groups using a write queuing mechanism, said method comprising:

applying a write Input/Output (I/O) queue interval to a Logical Unit (LU) member of a consistency group (CG), wherein a storage array where the LU member of the CG resides being a participating storage array, wherein the applying includes queuing write I/Os in a First-In-First-Out (FIFO) order;

marking each write I/O with a timestamp;

suspending I/O from the participating storage array to the LU member of the CG upon the participating storage array receiving a snapshot request from a master storage array, the snapshot request having a snapshot request timestamp;

determining a roundtrip latency between at least two participating storage arrays of the CG through an exchange of a pair of test messages;

determining a minimum time interval of the write I/O queue interval using the roundtrip latency; and determining whether the snapshot request timestamp is within the write I/O queue interval of the participating storage array based at least on the minimum time interval of the write I/O queue interval, wherein when the snapshot request timestamp is determined to be within the write I/O queue interval of the participating storage array, the participating storage array performs at least one of:
(a) completing each write I/O older than the snapshot request timestamp,
(b) creating a local snapshot for the LU member of the CG, or
(c) resuming I/O to the LU member of the CG.

12. The non-transitory computer-readable storage medium of claim 11, wherein the applying the write I/O queue interval to the LU member of the CG includes:

representing the write I/O queue interval as a time interval from a current time to a timestamp of an oldest write I/O in the queue.

* * * * *